Oct. 6, 1925.

J. HOFSTEDE 1,556,113

PAN AND PLATE LIFTER

Filed Dec. 13, 1924

INVENTOR.
Jacob Hofstede
BY
ATTORNEY.

Patented Oct. 6, 1925.

1,556,113

UNITED STATES PATENT OFFICE.

JACOB HOFSTEDE, OF LOMITA, CALIFORNIA.

PAN AND PLATE LIFTER.

Application filed December 13, 1924. Serial No. 755,606.

*To all whom it may concern:*

Be it known that I, JACOB HOFSTEDE, a citizen of Holland, residing at Lomita, in the county of Los Angeles and State of California, have invented new and useful Improvements in Pan and Plate Lifters, of which the following is a specification.

My invention relates to kitchen utensils and more particularly to a lifting utensil for pie-pans, plates and the like.

One object of my invention is to provide a kitchen utensil which may be used for handling hot pans and plates of all kinds without danger of spilling the contents thereof.

Another object is to provide a utensil of the character described which will be especially advantageous for use in placing pans and cooking vessels in hot ovens or in removing such pans or cooking vessels from hot ovens without danger of burning one's hands or arms.

Another object is to provide a utensil of the character described with a relatively long handle which may be used to securely hold ordinary pie pans or other pans while using same as a skillet or a corn popper, and by which an ordinary pan so used may be tilted at any angle to pour out its contents.

Referring to the drawings which accompany this specification and form a part thereof:—

Figure 1:
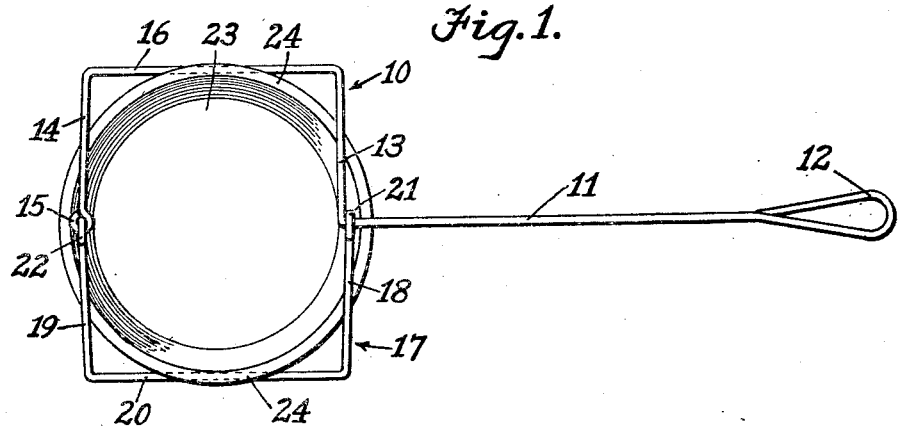
Fig. 1 is a plan view of a pie pan and of the preferred form of my pan lifter in position for lifting or holding the pan.

As shown in the various figures the pan lifter is preferably made of heavy wire in two parts which will be designated the handle part and the hanger part. The handle part consists of a U-shaped frame-piece 10 having an open, unobstructed side from which extends a relatively long handle 11, terminating in a loop 12, or other convenient form of hand grip, which extends at right angles to the adjacent leg 13 of frame-piece 10, the opposite leg 14 terminating in an eye 15 and the offset connecting bar 16 extending parallel to the handle.

The hanger part consists of a similar frame-piece 17 having legs 18 and 19 and a connecting bar 20 equal in length to the corresponding parts of frame-piece 10. Leg 18 terminates in an eye 21 which encircles handle 11 adjacent leg 13 of frame-piece 10, and leg 19 terminates in an eye 22 which engages with eye 15 of leg 14. Eyes 21 and 22, thus form a loose hinge with handle 11 and eye 15 so that the hanger part swings freely by its own weight on the handle part and hangs straight down while the latter may be turned through an angle of approximately 360°.

Figures 2, 3:
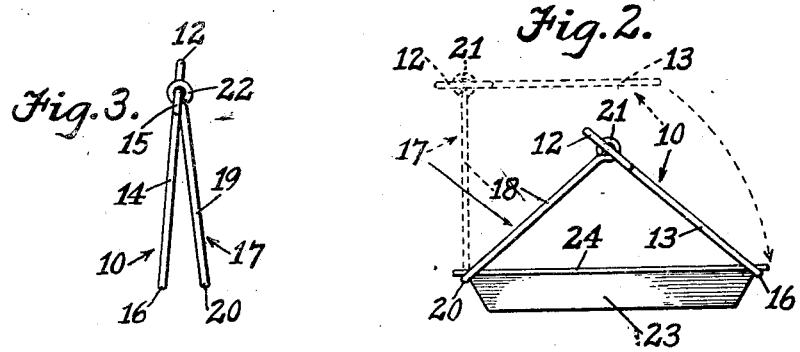
Fig. 2 is an end view of the pan lifter shown in Fig. 1, as seen from the handle end thereof, further illustrating its use in handling a pie pan.
Fig. 3 is an end view of my pan lifter in its folded condition as seen when looking at the end opposite the handle.
Figure 4:
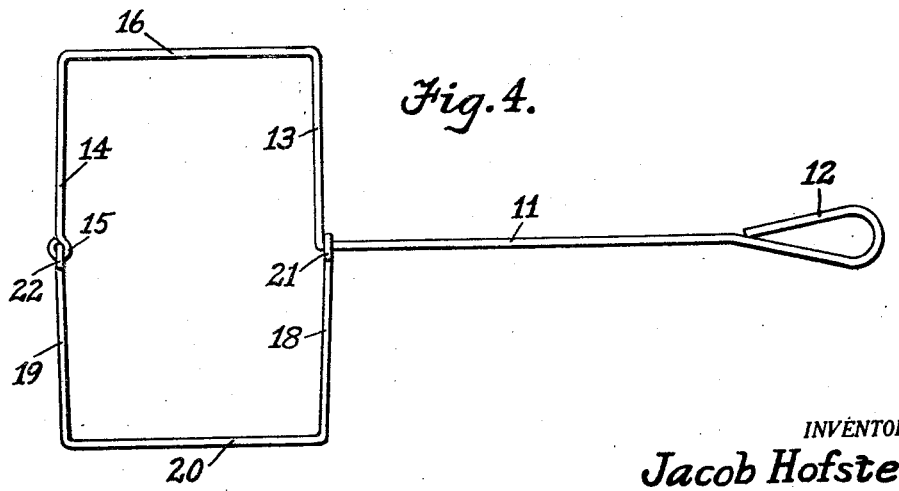
Fig. 4 is a plan view of the pan lifter in its most extended condition.

The operation of my pan lifter in applying it to a pan is very simple. The hanger part in its vertically depending condition is brought in contact with the pan 23 so that bar 20 engages the under side of the rim flange 24 as shown in dotted lines in Fig. 2. By means of handle 12 bar 16 is then swung laterally and downwardly, as indicated by the dotted arrow, until it engages the diametrically opposite under side of rim flange 24. The pan and lifter may then be lifted vertically, bars 16 and 20 becoming locked under rim flange 24 by the weight of the pan and contents combined with the interaction of the hinged handle and hanger parts.

Held in this manner the pan may be carried about readily and may be tilted to one side, as for pouring out the contents, without danger of becoming detached from the lifter, provided that the tilting be done toward the handle part so that the pull will come on the hanger part. The lifter is detached from the pan by simply reversing the operation described.

It is evident that any convenient form and size of pan may be used as a skillet when combined with my lifter and that two pie-pans or similar pans may be faced together and held in my lifter for use as a corn popper.

The pan and plate lifter is also reversible so that it may be used for pouring from either side of a pan. Furthermore, it may be applied to any form of pan, plate or dish, metal or porcelain, which has a rim flange, grooved sides or a beaded bottom with which side bars 16 and 20 may engage to hold such a utensil.

Having thus illustrated and described my invention, I claim:

A lifter for pans and plates comprising a wire handle bent to form at one end a U-shaped frame-piece having an open unobstructed side, and a complementary U-shaped frame-piece consisting of another wire, loosely hinged to said aforementioned frame-piece, said frame-pieces being adapted to cooperatively engage the edges of a pan or plate to lift the latter.

JACOB HOFSTEDE.